United States Patent
Takishima et al.

(10) Patent No.: US 7,860,326 B2
(45) Date of Patent: Dec. 28, 2010

(54) ADAPTABLE SHAPE IMAGE ENCODING APPARATUS AND DECODING APPARATUS

(75) Inventors: Yasuhiro Takishima, Saitama (JP); Satoshi Miyaji, Saitama (JP)

(73) Assignee: KDDI Corporation, Tokyo (JP)

( * ) Notice: Subject to any disclaimer, the term of this patent is extended or adjusted under 35 U.S.C. 154(b) by 1251 days.

(21) Appl. No.: 10/942,126

(22) Filed: Sep. 16, 2004

(65) Prior Publication Data

US 2005/0094884 A1    May 5, 2005

(30) Foreign Application Priority Data

Sep. 22, 2003  (JP) ............... 2003-329805
Sep. 22, 2003  (JP) ............... 2003-329806

(51) Int. Cl.
*G06K 9/36* (2006.01)

(52) U.S. Cl. ............... 382/236; 382/232; 382/233; 382/238; 382/239; 382/243

(58) Field of Classification Search ........ 382/232–253
See application file for complete search history.

(56) References Cited

U.S. PATENT DOCUMENTS

| 6,259,732 B1 * | 7/2001 | Lee ................. 375/240 |
| 6,611,559 B1 * | 8/2003 | Shingo et al. ........ 375/240.16 |
| 6,754,269 B1 * | 6/2004 | Yamaguchi et al. ..... 375/240.1 |
| 2001/0004385 A1 * | 6/2001 | Okumura et al. ....... 375/240.16 |
| 2003/0118100 A1 * | 6/2003 | Honda et al. .......... 375/240.08 |
| 2004/0028282 A1 * | 2/2004 | Kato et al. ................. 382/236 |
| 2004/0105597 A1 * | 6/2004 | Lelescu et al. ............. 382/276 |

FOREIGN PATENT DOCUMENTS

| JP | 10-271341 A | 10/1998 |
| JP | 10271341 A | 10/1998 |
| JP | 11-266454 | 9/1999 |
| JP | 2002-312778 A | 10/2002 |
| WO | WO 03026315 A1 * | 3/2003 |

OTHER PUBLICATIONS

Japanese Office Action dated Nov. 21, 2007 issued in corresponding Japanese Application No. 2003-329805.
Japanese Office Action dated Dec. 3, 2008, Application No. 2003-329805.

* cited by examiner

*Primary Examiner*—Vikkram Bali
*Assistant Examiner*—Daniel Zeilberger
(74) *Attorney, Agent, or Firm*—Westerman, Hattori, Daniels & Adrian, LLP

(57) ABSTRACT

The present invention improves the encoding efficiency, image quality, resolution, and the like of an input image having a special property, for example, an image input from a special camera. The input image is sliced according to a recognized shape and divided into blocks having a size according to a pixel density or an image resolution. Then, an object in the image is defined using a parameter including the numbers of the sliced images and the amounts of shift of the sliced images from a reference position, and the respective blocks are encoded using the movement of the object. Further, when a partial image is cut out from a base image, encoded, and then transmitted, a processing load in the encoding processing is reduced by encoding the partial image making use of preprocessing data.

6 Claims, 8 Drawing Sheets

Fig. 5

| | |
|---|---|
| | INFORMATION (COORDINATE AND THE LIKE OF BORDER) OF THE ALL IMAGE |
| SLICE 1 | START POINT P1 OF SLICE 1 (UPPERMOST LEFT COORDINATE X1, Y1) |
| | BLOCK SIZE (8x8) IN SLICE 1 |
| | COORDINATE (X1, Y1) OF BLOCK B1 IN SLICE 1 |
| | COORDINATE (X2, Y1) OF BLOCK B2 IN SLICE 1 |
| | ⋮ |
| | COORDINATE (Xn, Yn) OF BLOCK Bn IN SLICE 1 |
| SLICE 2 | START POINT P2 OF SLICE 2 (UPPERMOST LEFT COORDINATE U1, V1) |
| | BLOCK SIZE (8x8) IN SLICE 2 |
| | COORDINATE (U1, V1) OF BLOCK B1 IN SLICE 2 |
| | ⋮ |
| SLICE 3 | START POINT P3 OF SLICE 3 |
| | |

0 : IMPOSING NO RESTRICTION ON REFERNECE BLOCKS
①: NOT REFER TO LEFT BLOCK ROW
②: NOT REFER TO UPPER BLOCK COLUMN
③: NOT REFER TO LIGHT BLOCK ROW
④: NOT REFER TO LOWER BLOCK COLUMN
⑤: REFER ONLY UP TO 1 BLOCK ROW ON THE LEFT SIDE

ADAPTABLE SHAPE IMAGE ENCODING APPARATUS AND DECODING APPARATUS

BACKGROUND OF THE INVENTION

1. Field of the Invention

The present invention relates to an adaptable shape image encoding apparatus and a decoding apparatus for effectively encoding or decoding an image having a special shape.

2. Description of the Related Art

An example of conventional arts for cutting out a partial image having an arbitrary shape from an input image and encoding the partial image is disclosed in, for example, Japanese Patent Application Laid-Open (JP-A) No. 11-266454.

This publication discloses an encoding apparatus for selecting an arbitrary region from a rectangular input image and encoding the position and the shape of the region or for making the quality of the image of the region better than that of the other region by adjusting various parameters. Further, the publication discloses to separate encoded data having been input, to decode the position and the shape of the above region from the separated encoded data as well as to decode encoded parameters, and to decode the image of the above arbitrary region using the decoded parameters.

The conventional art discloses the apparatus for cutting out the arbitrary region from the rectangular input image and encoding and decoding the image of the cut-out region so that the quality of the image is made better than that of the other region. However, when the input image has a special property by itself, for example, when the input image is recorded by an omnidirectional type camera, the conventional art does not take to improve an encoding efficiency and the like based on the special property into consideration at all. In other words, the conventional art is disadvantageous in that it cannot improve an encoding efficiency, image quality, resolution, and the like of an image having a special property.

Further, when a plurality of partial images, in particular, whose positions move are cut out from a base image, which is an image recorded by the omnidirectional type camera, and transmitted, each of the cut-out images is subjected to encoding processing, from which a problem arises in that a large processing load is imposed on the encoding as well as a long processing time is necessary.

SUMMARY OF THE INVENTION

An object of the present invention is to provide an adaptable shape image encoding apparatus and a decoding apparatus that can improve the encoding efficiency, image quality, resolution and the like of an image having a special property, for example, an image input from, for example, a special camera.

Another object of the present invention is to provide an adaptable shape image encoding apparatus which can reduce a processing load imposed on encode processing when a partial image whose position or size changes as times pass is cut out from a base image and transmitted after it is encoded.

In order to achieve the object, the first feature of the present invention resides in that an adaptable shape image encoding apparatus comprises means for slicing an image so that it is adaptable to the shape of an input image and dividing the sliced images into blocks having a size according to at least one of the image density and the image resolution of the input image, and means for defining the movement of a object in the image using parameters including data for specifying the sliced images and the amounts of shift of the sliced images from a reference position and for encoding the respective divided blocks using the movement of the object.

The second feature of the present invention resides in that the locus of the slicing is a curve according to at least one of the pixel density and the image resolution of the input image.

The third feature of the present invention resides in that an adaptable shape image encoding apparatus for cutting out partial images from a base image having a predetermined shape so that the partial images have a size smaller than that of the base image comprises preprocessing means for obtaining preprocessing data including an optimum motion vector and an orthogonal transformation coefficient to the respective blocks of the base image according to predetermined rules as to reference blocks and storing the preprocessing data, and partial image encoding means for obtaining the preprocessing data corresponding to the blocks included in a partial image cut out from the base image and encoding the partial image.

The fourth feature of the present invention resides in that the reference position of the partial image is apart from the reference position of the base image by at least one of a unit of a block and a macro block.

The fifth feature of the present invention resides in that the position or the size of the partial image cut out from the base image can change as a times passes.

BRIEF DESCRIPTION OF THE DRAWINGS

FIG. 5 is an explanatory view of a divided data size of an input image and a data format of position information.

DETAILED DESCRIPTION OF THE PREFERRED EMBODIMENT

Figure 1:
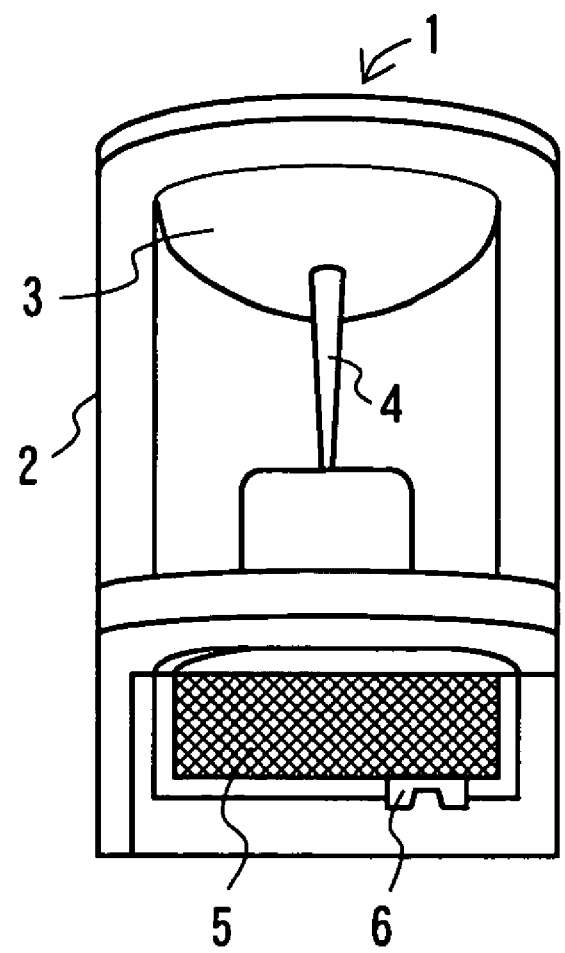
FIG. 1 is a explanatory view of a structure of an omnidirectional camera.

The present invention will be explained below in detail with reference to the drawings. FIG. 1 is a conceptual view of an omnidirectional camera, FIG. 2 shows an example of a screen of a display of a personal computer or the like, the screen displaying image data recorded by an omnidirectional imaging camera.

The omnidirectional camera is knwon well, and various types of the omnidirectional camera are available. The omnidirectional imaging camera 1 shown in FIG. 1 is composed of a transparent acrylic cylinder 2, a semi-spherical or bowl-shaped omnidirectional mirror 3, a center needle 4, a CCD camera 5, and a cable connector 6. The omnidirectional mirror 3 is disposed on an upper surface inside the cylinder 2, the center needle 4 extends from the center of the omnidirectional mirror 3 downward, and the CCD camera 5 and the cable connector 6 are disposed below the center needle 4. Note that, since the camera is known well, it is not explained in detail.

Figure 2:
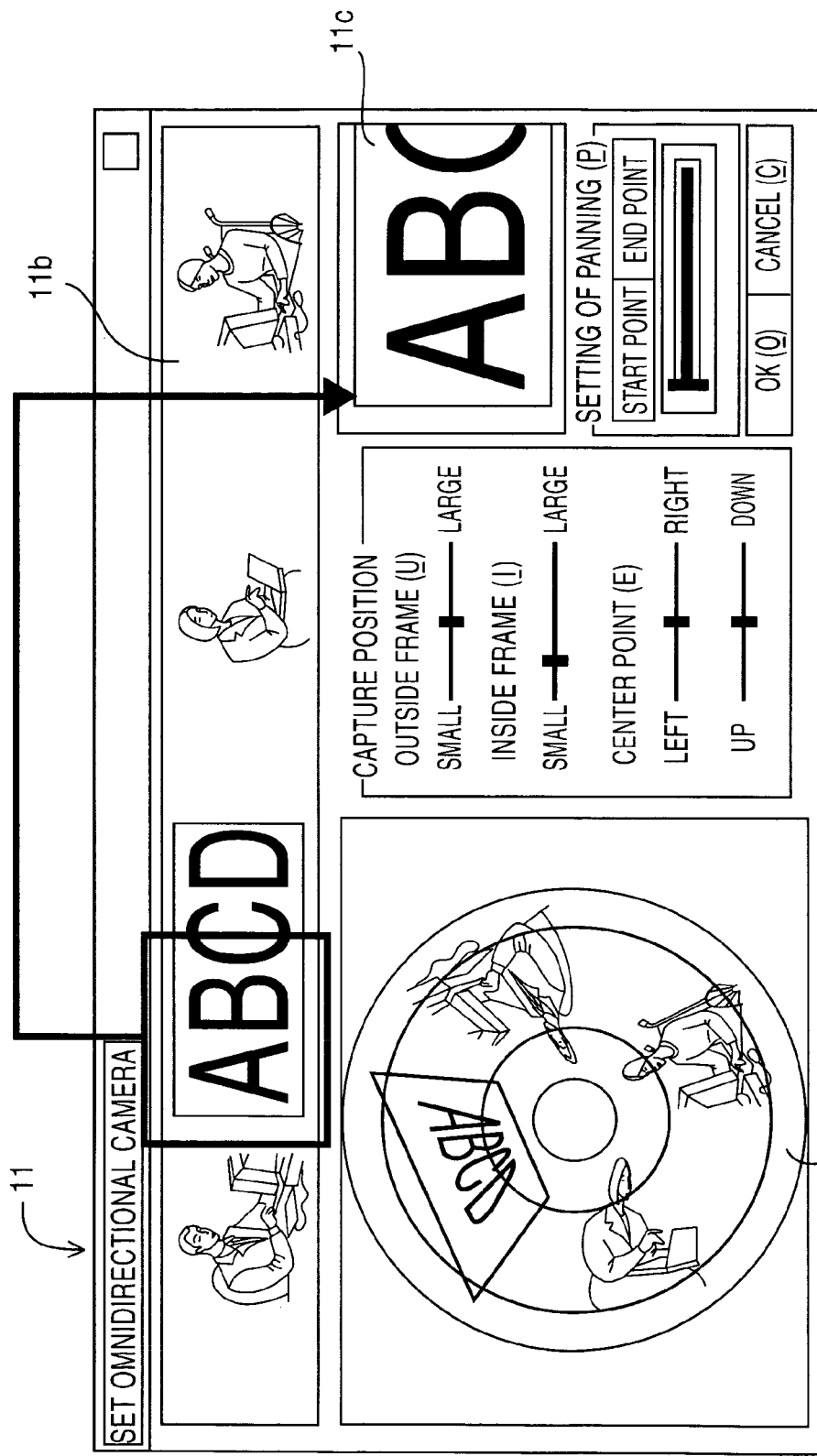
FIG. 2 is a view showing an example of an image recorded by the omnidirectional camera and displayed on a display.

When the omnidirectional imaging camera 1 is connected to the personal computer or the like through the cable connector 6, and an image recorded by the omnidirectional imaging camera 1 is displayed on the display, a screen 11 shown in FIG. 2 is obtained. Displayed on the screen 11 is a doughnut-shaped 360° omnidirectional image 11a, which is an image itself recorded by the omnidirectional imaging camera 1, an image 11b obtained by expanding the omnidirectional image 11a in a strip state, that is, the panorama-like expanded image 11b, and an image 11c obtained by cutting out a part of the image 11b and having an ordinary one frame size. The image 11c can be transmitted or delivered to, for example, a mobile phone and the like.

Images obtained from the omnidirectional imaging camera 1 are video pictures of, for example, 15 frames/sec likewise those obtained by an ordinary camera for PC. The expanded image 11b is several times larger than an ordinary frame size of an image recorded by, for example, the camera for PC. Accordingly, when the expanded image 11b is transmitted to the mobile phone and the like, a partial image whose position shifts from that of a base image is cut out therefrom and transmitted after it is encoded. When a plurality of different partial images are created at the same time using the conventional art, a processing load in encoding processing increases in proportion to the number of the partial images.

Figure 3:
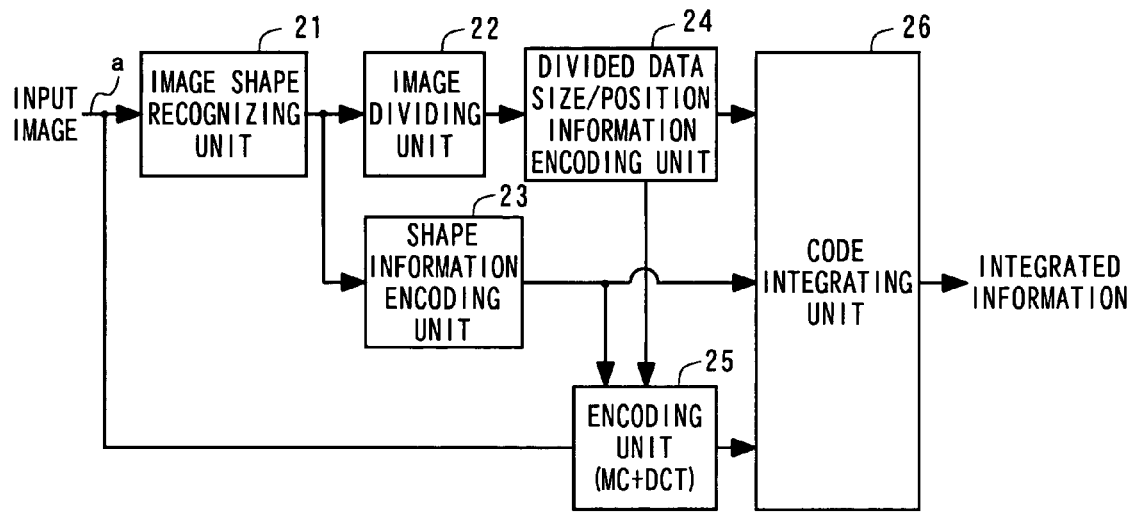
FIG. 3 is a block diagram showing a schematic arrangement of an encoding apparatus of an embodiment of the present invention.

An embodiment of the present invention will be explained. FIG. 3 is a block diagram showing a schematic arrangement of the embodiment.

In FIG. 3, an image shape recognizing unit 21 detects the shape, size, and the like of an input image (a) itself having a special property such as an image recorded by a special camera (for example, omnidirectional camera), and the like. When the image (a) is an image input from the omnidirectional camera, the image shape recognizing unit 21 recognizes that the image has a circular shape. The shape can be automatically detected and recognized by a method of using the time direction difference of the input image, and the like. For example, in the circular image 11a shown in FIG. 2, since no image exists in the outside region of the circular image, the time direction difference is 0, but it is not 0 in the inside region of the circular image. Accordingly, it can be recognized that the input image (a) is the circular image. When it is determined by the same method that no image also exists in a center region, in addition to the outside region, it can be recognized that the input image (a) is an image formed in the doughnut shape.

Further, when the image region is specified, the size thereof can be automatically recognized. Note that, even if the input image (a) has a special shape, the image shape recognizing unit 21 can be omitted when the shape and the size thereof are already known.

An image dividing unit 22 divides the input image (a) into a processed unit taking the shape and the size and/or the image resolution thereof into consideration. For example, it is possible to divide the input image (a) into a hierarchy unit such as a slice, macro block, and block.

Figure 4A:
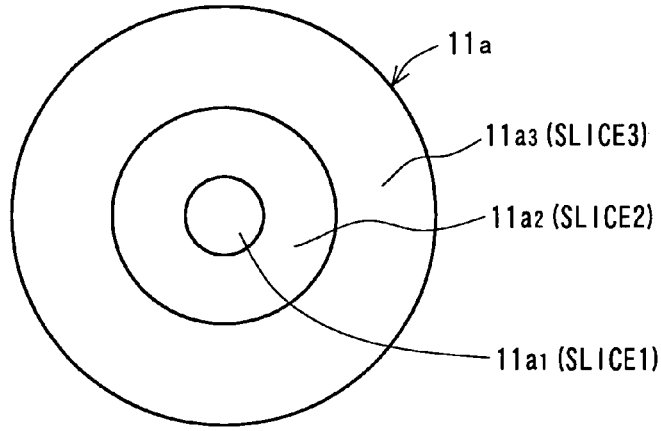
FIGS. 4A and 4B are explanatory view showing examples of sliced images and divided images in an embodiment of the present invention, respectively.
Figure 4B:
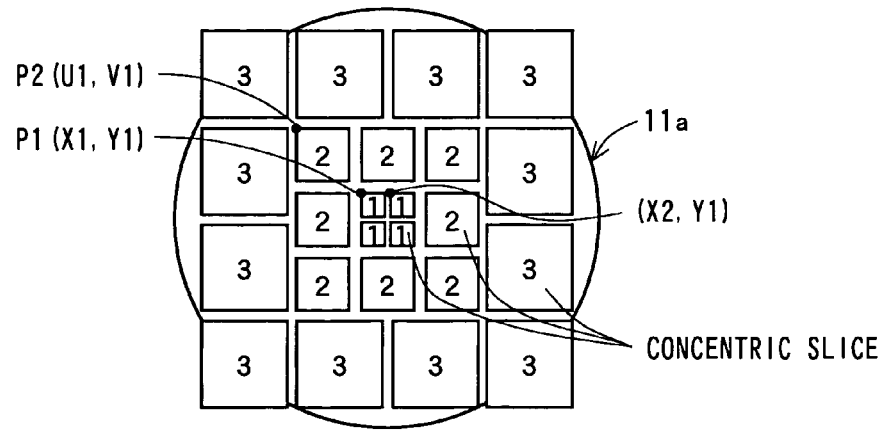

For example, the circular input image 11a as shown in FIG. 4A is concentrically sliced, and concentric circular regions 11a1, 11a2, 11a3, ... are formed from the center toward the outside. Then, the respective concentric circular regions 11a1, 11a2, 11a3, ... are divided into macro blocks or blocks as shown in FIG. 4B.

In this case, the processed units may be set to a different size and a different shape according to a pixel density or an image resolution. For example, when an image has an image resolution which is high at the center of a circle and gradually decreases radially, it is possible to make the number of pixels constituting the macro block and the block uniform and to make the area (size) of the macro block and the block and the number of the macro blocks and the blocks every one slice variable. That is, as shown in FIG. 4B, it is possible to increase the area of the macro blocks and the blocks or to increase the number of the macro block and the block in one slice toward a radial direction. Note that the magnitude of the pixel density in all the images can be detected by a known method. Further, when an image portion having a large pixel density and an image portion having a small pixel density are already known, it is not necessary to detect the pixel density anew.

For example, in the circular input image 11a as shown in FIG. 4A, the pixel density or the image resolution is higher toward a central portion. Accordingly, as shown in FIG. 4B, the size of macro blocks or blocks 1 at the central portion is made smaller than that of macro blocks or blocks 2, and the size of the macro blocks or blocks 2 is made smaller than that of macro blocks or blocks 3. In other words, since the respective macro blocks or blocks have the same number of pixels of 16×16 or 8×8 pixels, they have a larger pixel density as they are located nearer to the central portion. Note that the numerals in FIG. 4B denote the number of blocks and slices described above.

Next, a shape information encoding unit 23 of FIG. 3 defines an image shape by, for example, a two-dimensional orthogonal coordinates, polar coordinates, and the like as information of the image shape and the like and encodes the coordinate data of the image shape. The data of the image shape is sent to a code integrating unit 26. Note that when the image shape of the input image (a) is already known, the information of the image shape can be omitted because the information of the image shape can be previously notified to a receiving side.

Next, a divided data size/position information encoding unit 24 encodes the divided data size of the respective macro blocks or blocks and the position information thereof. The divided data size and the position information are sent to the code integrating unit 26.

FIG. 5 is an explanatory view of the data format of the divided data size of the respective blocks and the position information thereof. First, data as to the boundaries (the coordinates of the boundaries, and the like) of all the images are registered, and then data as to slices 1, 2, 3, ... are listed. To explain the data as to the slice 1 as a typical example, first, the start point of the slice 1 is registered. The start point can be set to, for example, the upper left coordinate P1 (X1, Y1) (refer to FIG. 4B) of the blocks belonging to the slice 1. Next, the size of the blocks in the slice 1, for example, 8×8 is registered. When the size is previously determined, the registration thereof can be omitted. Next, the upper left coordinates (X1, Y1) to (Xn, Yn) of blocks B1 to Bn belonging to the slice 1 are sequentially registered.

Note that when stationary images are handled, the divided data size/position information encoding unit 24 can be omitted because the divided data size and the position information are already known.

Next, an operation of an encoding unit 25 will be explained. Although many kinds of systems can be applied to the encoding of an image, an MC (motion compensation) and DCT system can be applied as an example. In this case, the blocks included in a certain slice are sequentially encoded, and then the blocks included in a next slice are encoded on the completion of encoding of the above blocks. This encoding is executed until the blocks included in a final slice are encoded. In the example of FIG. 4, the blocks included in the slice 1 are first sequentially encoded, and then the blocks 2 included in the slice 2 are sequentially encoded on the completion of encoding of the above blocks. Further, on the completion of encoding of the blocks included in the slice 2, the blocks 3 included in the slice 3 are sequentially encoded.

When the MC (motion compensation) and DCT system are applied, it is possible, as an example, to define a motion vector reference position in the MC as data (for example, number) that pecifies a block and macro block, which exist at a position indicated by an offset value, and a slice to which they belong and as an amount of shift of the slice from a reference position. The DCT and quantization can be executed in a unit of block.

In the circular input image 11a or the doughnut-shaped image, it is found statistically that moving objects such as persons and the like tend to move into a concentric circular image, that is, to move in a circumference direction in a slice. Accordingly, encoding can be executed in conformity with the movement and the spatial correlating property of the moving objects in an image when encoding in the sequence of slices as well as in the sequence of blocks in the respective slices as described above. As a result, an encoding efficiency can be improved. Further, when the motion vector reference position in the MC is defined as the number of the slice and the amount of shift of the slice from the reference position, the encoding can be executed in conformity with the movement and the spatial correlating property of the objects in the image, thereby the encoding efficiency can be improved.

Next, the code integrating unit 26 uses the image shape, the divided data size, and the position information as a header, integrates the header with the encoded image information from the encoding unit 25 and outputs the integrated information. With the above operation, the input image (a) having the special property can be encoded effectively. That is, the encoding can be executed in conformity with the movement and the spatial correlating property of the objects in the image. Further, an image portion having a large pixel density can be finely encoded, whereas an image portion having a small pixel density can be coarsely encoded.

Figure 6:
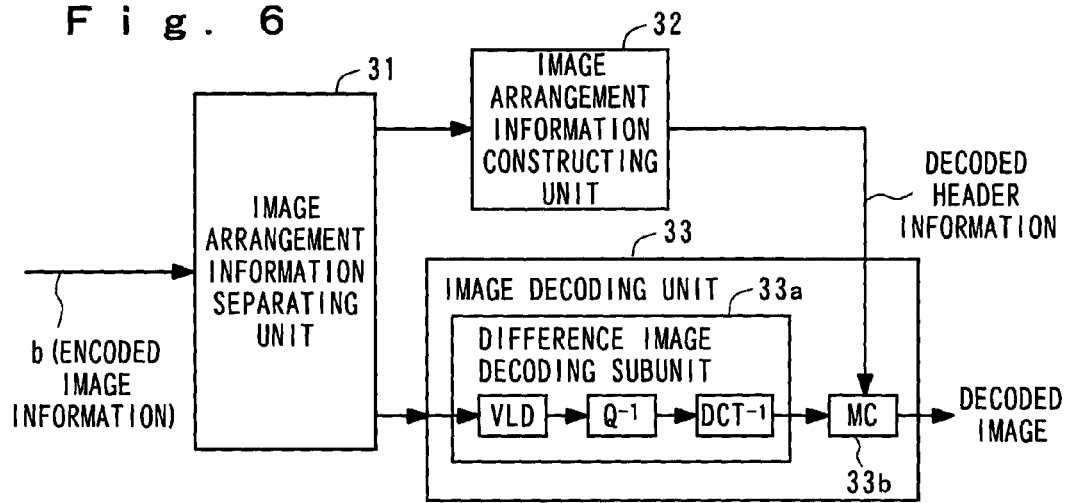
FIG. 6 is a block diagram showing a schematic arrangement of a decoding apparatus of an embodiment of the present invention.

Next, an embodiment of an adaptable shape image decoding apparatus will be explained with reference to FIG. 6. An image arrangement information separating unit 31 divides encoded image information (b) having been input into the header information and the image information. The header information is sent to an image arrangement information constructing unit 32 and decoded therein. The decoded header information is sent to a motion compensation subunit MC (33b) of an image decoding unit 33.

In contrast, the image information is sent to the image decoding unit 33. The image decoding unit 33 is composed of a difference image decoding subunit 33a and the motion compensation subunit 33b. Further, the difference image decoding subunit 33a is composed of a variable length decoding portion VLD, an inverse quantization portion $Q^{-1}$, and an inverse DCT portion $DCT^{-1}$. The difference image decoding subunit 33a outputs a decoded DCT by a known operation. The DCT is subjected to motion compensation in the motion compensation subunit 33b, and a decoded image is output therefrom.

According to the embodiment, since the input image is divided into blocks having a size according to the pixel density or the image resolution thereof and encoded, it can be encoded according to an accuracy based on the pixel density or the image resolution, thereby the encoding efficiency can be improved. Further, since the movement of the objects in the image is defined using a parameter which includes the data for specifying the slice and the amount of shift of the slice from the reference position, the movement and the spatial correlating property of the objects in the image can be effectively expressed, thereby the encoding efficiency can be improved also in this respect. Further, when the apparatus of the embodiment is applied to an image having a special property such as a circular image or a doughnut-shaped image recorded by the omnidirectional camera, an excellent encoding efficiency, image quality, resolution, and the like can be expected.

Next, as described above, the expanded image 11b (refer to FIG. 2) is several times larger than the ordinary frame size of an image and the like recorded by, for example, the camera for PC. Accordingly, when the expanded image 11b is transmitted to the mobile phone and the like, a partial image whose position shifts from that of a base image is cut out therefrom and transmitted to the mobile phone after it is encoded. When a plurality of different partial images are created at the same time using the conventional art, a processing load in encoding processing increases in proportion to the number of partial images.

Figure 7:
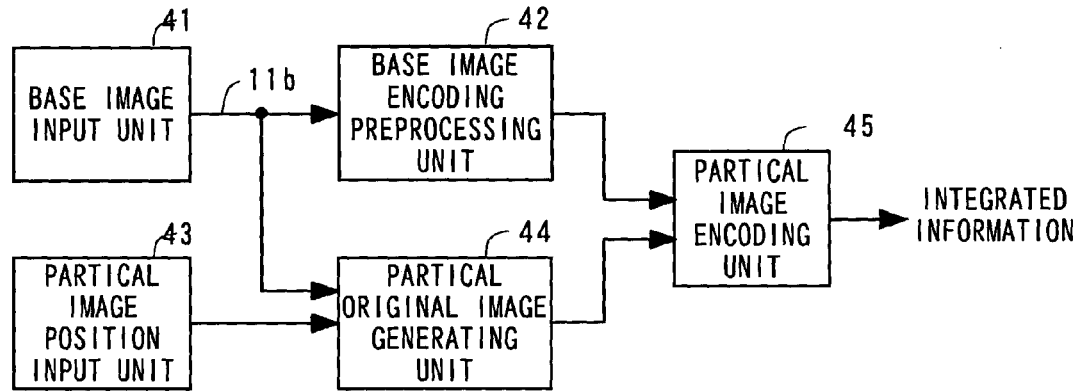
FIG. 7 is a block diagram showing a schematic arrangement of another embodiment of the present invention.

An embodiment of the present invention for solving the above drawback will be explained with reference to the block diagram of FIG. 7.

The expanded image (hereinafter, referred to as base image) 11b is input from a base image input unit 41. An base image encoding preprocessing unit 42 subjects all the small regions of the expanded image 11b, for example, the blocks (8×8 pixels) or macro blocks (16×16 pixels) thereof to encoding preprocessing. The base image encoding preprocessing unit 42 executes motion estimation (ME)/motion compensation (MC) and orthogonal transformation (for example, DCT) processing in a case of, for example, MPEG using correlation to an adjacent block or while restricting the use of the correlation to the adjacent block. The data resulting from the preprocessing is stored in a not shown memory in the base image encoding preprocessing unit 42. This will be explained later in detail with reference to FIG. 8.

A partial image position input unit 43 inputs the initial position, the moving speed, and the like of a partial image cut out from the expanded image 11b. Note that the initial position of the partial image is determined at a position apart from the reference position of the base image by a block or a macro block unit. A partial original image generating unit 44 determines the size and the position of the partial image. Further, the partial original image generating unit 44 cuts out the partial image based on an input signal from the partial image position input unit 43 and outputs the partial image. In this case, as apparent from the explanation described below, the partial image is cut out so that the reference position thereof is located at the position apart from the reference position of the base image by the block or macro block unit.

A partial image encoding unit 45 encodes a partial original image input from the partial original image generating unit 44 using the data created by and stored in the base image encoding preprocessing unit 42. In this case, the peripheral portion of the partial original image uses the data obtained by the processing in which it is restricted to use the correlation of the image with an adjacent block, and the interior of the partial original image uses the data obtained by the processing in which the correlation of the image with the adjacent block is used.

Figure 8:
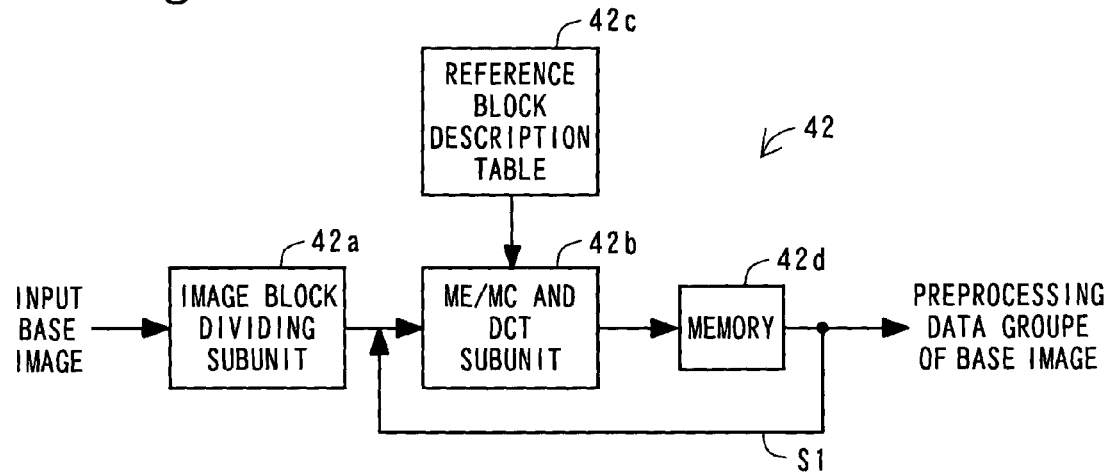
FIG. 8 is a block diagram showing a base image encoding preprocessing unit of FIG. 7 in detail.

FIG. 8 is a block diagram showing the detailed function of the base image encoding preprocessing unit 42 described above. The base image encoding preprocessing unit 42 is composed of an image block dividing subunit 42a, an ME/MC and DCT subunit 42b, a reference block description table 42c, and a memory 42d.

Figure 9:
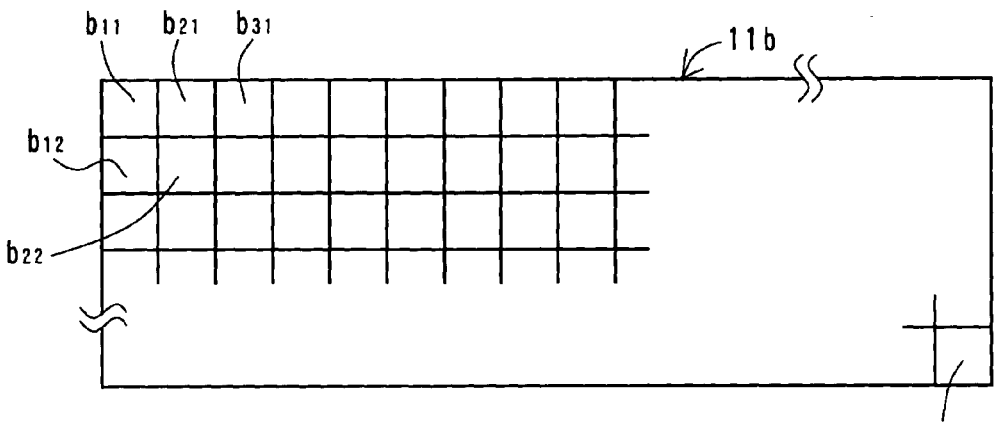
FIG. 9 is an explanatory view of a base image divided into blocks.

As shown in FIG. 9, the image block dividing subunit 42a divides the expanded image 11b as the base image into blocks $b_{11}, b_{21}, b_{31}, \ldots, b_{nn'}$ of, for example, 8×8 pixels or 16×16 pixels. The ME/MC and DCT subunit 42b determines motion vectors according to a reference block selection rules described in the reference block description table 42c so that the motion vectors are optimum in the respective rules and then determines DCT coefficients according to the motion vectors. The motion vectors and the DCT coefficients are stored in the memory 42d. A loop S1 of FIG. 8 circulates as many times as the number of descriptions of the reference block.

Figure 10:
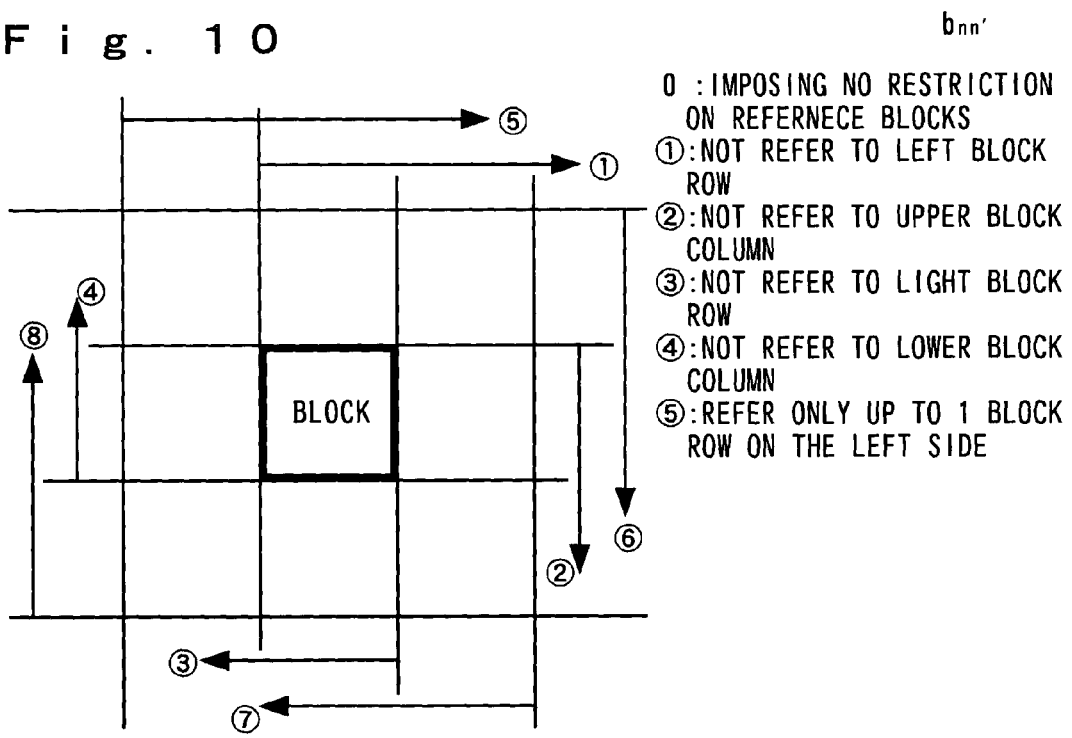
FIG. 10 is an explanatory view of a reference block description table of FIG. 8.

As shown in FIG. 10, the reference block description table 42c describes the rules for example, 0: imposing no restriction on reference blocks, ①: not refer to left block row, ②: not refer to upper block column, ③: not refer to right block row, ④: not refer to lower block column, ⑤: refer only up to 1 block row on the left side, ⑥: refer only up to 1 block column on the upper side, ⑦: refer only up to 1 block row on the right side, ⑧: refer only up to 1 block column on the lower side, and the like. Note that the table may also describe other rules and add a description that reference is made to the blocks of a previous frame.

The ME/MC and DCT subunit 42b determines optimum motion vectors MV and DCT coefficients corresponding to them for the respective blocks $b_{11}, b_{21}, b_{31}, \ldots, b_{nn'}$ and for the respective rules and stores them in the memory 42d.

When it is assumed that the blocks $b_{11}, b_{21}, b_{31}, \ldots, b_{nn'}$ are macro blocks of 16×16 pixels, the optimum motion vectors $MV_0$ to $MV_k$ ($k \geqq 8$) for the each macro block are determined as to the respective rules 0-⑧ and the combinations thereof (for example, rule ①+②). Further, as to the DCT coefficients, the four DCT (DCT1 to 4) coefficients of brightness and the two DCT (DCT5 to 6) coefficients of chromaticity are determined, respectively for four 8×8 pixels. These coefficients of the motion vectors MV and DCTs (preprocessing data group) are stored in the memory 42d.

The base image encoding preprocessing unit 42 outputs the preprocessing data group of the base image as described above.

Figure 11:
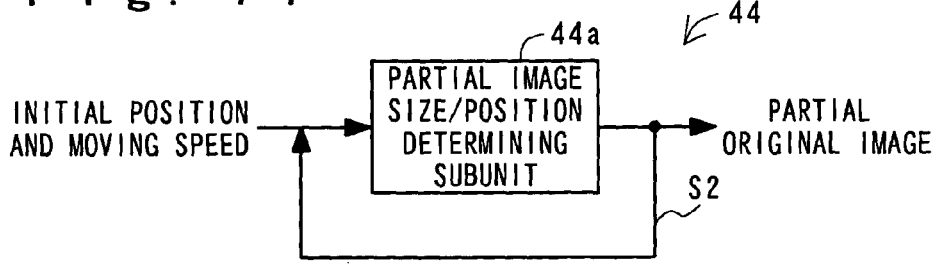
FIG. 11 is a block diagram showing a partial original image creation unit of FIG. 7 in detail.

Next, a function of the partial original image generating unit 44 will be explained in detail with reference to FIG. 11. The partial original image generating unit 44 is composed of a partial image size/position determining subunit 44a. The partial image size/position determining subunit 44a receives the initial position, the moving speed and the like of the partial image from the partial image position input unit 43 as well as determines the size and the position of the partial image. A loop S2 circulates as many times as the number of cut-out partial images. Panning, tilting, zooming, and the like of a frame to be encoded is executed by the function. That is, when the position of the partial image is changed, the panning, tilting, and the like are executed, and when both the position and size of the partial image are changed, the zooming is executed.

Figure 12:
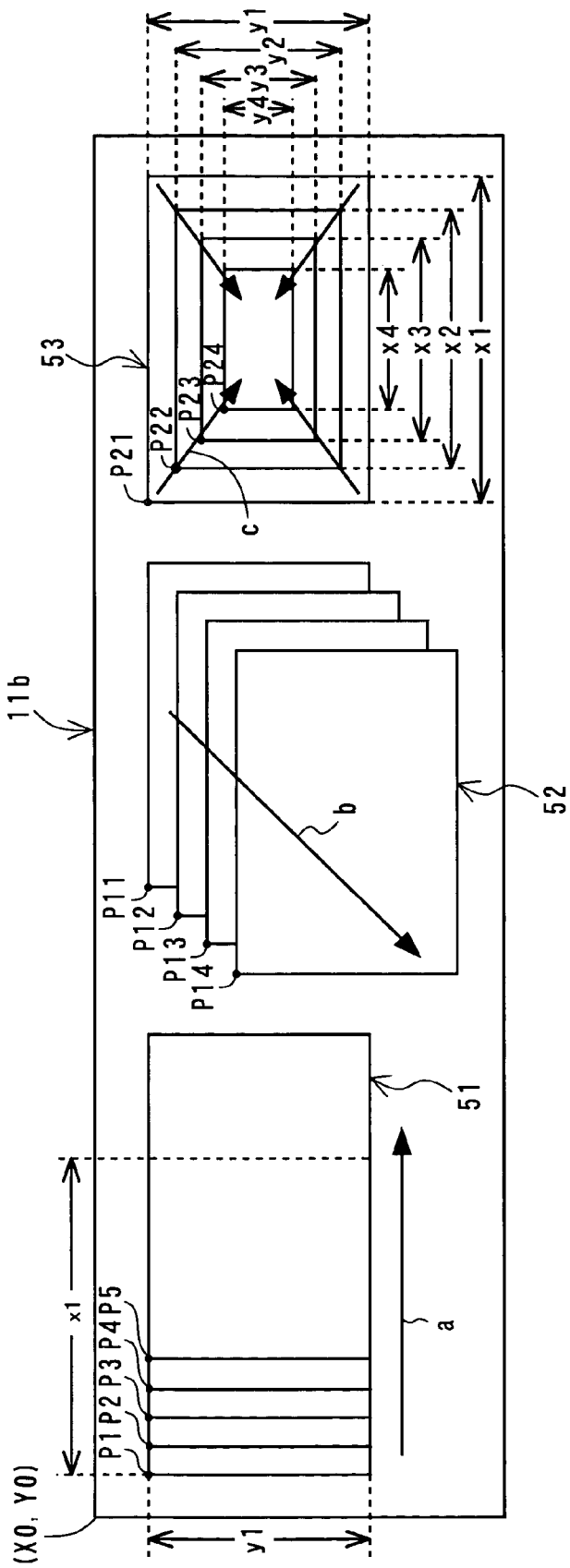
FIG. 12 is a view showing an example of partial images whose positions or sizes change.

FIG. 12 shows examples of panning, tilting, and zooming by reference numeral 51, 52, and 53, respectively. In FIG. 12, (X0, Y0) show the reference position of the base image 11b, and it is assumed that the partial image is a rectangle having a size of x1×y1. Further, in the panning 51, tilting 52, and zooming 53, the initial positions P1, P11 and P21 of the partial image, which is cut out first, are set at positions spaced apart from the reference position (X0, Y0) of the expanded screen 11b by a unit of 8 pixels or 16 pixels in X- and Y-directions, respectively.

Next, when the panning 51 is executed in the direction of an arrow (a), the reference positions p1, p2, and p3, . . . of respective screens are shifted in the direction of the arrow (a) in a unit of 8 pixels or 16 pixels at a speed (panning speed) designated by the partial image position input unit 43. Further, when the tilting 52 is executed in the direction of an arrow (b), the reference positions P11, P12, P13, . . . of the respective screens are shifted in the direction of the arrow (b) by the unit of 8 pixels or 16 pixels in both the X- and Y-directions. Further, when the zooming 53 is executed, a screen size is changed to x1×y1, x2×y2, x3×y3, . . . as well as the reference positions P21, P22, P23, of these screens are shifted in the direction of an arrow (c) by the unit of 8 pixels or 16 pixels in both the X- and Y-directions. A reason why the reference positions of the respective screens are shifted in both the X- and Y-directions by the unit of 8 pixels or 16 pixels is to use the preprocessing data, which is obtained by the base image encoding preprocessing unit 42, without adding any other processing when the partial image is encoded by the partial image encoding unit 45.

Figure 13:
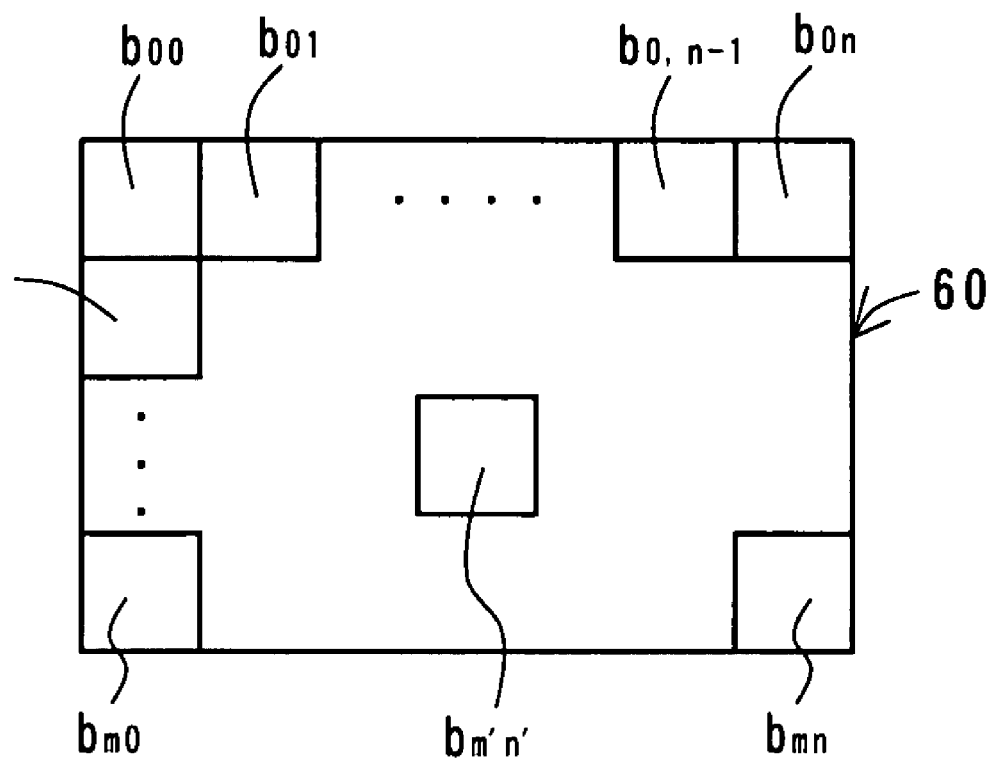
FIG. 13 is an explanatory view of an operation of the partial image encoding unit of FIG. 7.

When the size and position of the partial image are determined by the partial image size/position determining subunit 44a, the partial image encoding unit 45 executes the encoding of the respective partial images such as the panning 51, tilting 52, zooming 53 and the like. In the encoding processing, preprocessing data (motion vectors and DCT) applied the rules ①+②, which prohibit a reference to the left block row and upper block column, is read out from the memory 42d and used for the blocks of the peripheral portions of respective partial images, for example, to an upper left corner block $b_{00}$ of a partial image 60 shown in FIG. 13. Further, preprocessing data applied the rule ②, which prohibits a reference to the upper block column, is used for respective upper blocks $b_{01}$ to $b_{0,n-1}$. Further, preprocessing data applied the rules ②+③, which prohibit a reference to the upper block column and right block row, is used for an upper right corner block $b_{0n}$. Further, preprocessing data, to which the rule ① is applied, is used for left peripheral blocks $b_{10}$ to $b_{m-1,0}$, and preprocessing data, to which the rules ①+④ are applied, is used for a lower left corner blocks $b_{m0}$. Further, preprocessing data, to which the rule 0, which does not restrict a reference to blocks, is used for central blocks $_{m', n'}$. Further, preprocessing data when a previous frame block is referred to may be used.

As described above, in the partial image (cut-out image), the mode which restricts to use the correlation between adjacent blocks of the base image, or a unique processing mode is used in the peripheral blocks of the partial image, and the mode, which uses the correlation between adjacent blocks of the base image is used in the other blocks (i.e. interior blocks) of the partial image.

Thereafter, the partial image encoding unit 45 quantize the preprocessing data read out from the memory 42d by a known method and outputs the quantized partial image data after it is subjected to variable length encoding (VLC). The output data can be sent to a mobile phone and through the Internet.

According to the above embodiment, an encoding efficiency can be improved because the preprocessing data is determined according to the rules which do not restrict referring to the blocks and the rules which restrict referring to the upper, lower, left or right block column and encoding is executed using the preprocessing data.

What is claimed is:

1. An adaptable shape image encoding apparatus for cutting out partial images from a base image having a predetermined shape so that the partial images have a size smaller than that of the base image comprising:

a reference block description table that stores predetermined rules for selecting reference blocks used to determine a motion vector, the reference blocks being blocks adjacent to a block of the base image;

preprocessing means for generating preprocessing data by generating a plurality of motion vectors for the block of the base image and orthogonal transformation coefficients respectively corresponding to the plurality of motion vectors, the respective motion vectors being generated based on a correlation between the block of the base image and reference blocks selected according to the predetermined rules, wherein each of the predetermined rules for selecting reference blocks stored in the reference block description table defines different reference blocks adjacent to the block of the base image that are selected and used to generate a different motion vector of the plurality of motion vectors generated for the block of the base image;

storing means for storing the preprocessing data; and partial image encoding means for obtaining preprocessing data corresponding to a block included in a partial image cut out from the base image and encoding the partial image using the preprocessing data.

2. An adaptable shape image encoding apparatus according to claim 1, wherein a reference position of the partial image is apart from a reference position of the base image by at least one of a unit of a block and a macro block.

3. An adaptable shape image encoding apparatus according to claim 1 or 2, wherein the position or the size of the partial image cut out from the base image can change as a times passes.

4. An adaptable shape image encoding apparatus according to claim 1 or 2, wherein the predetermined rules include rules for imposing no restriction on reference blocks and rules for imposing a restriction on an upper, or lower block column, or a left or right block row of the reference blocks.

5. An adaptable shape image encoding apparatus according to claim 4, wherein the partial image encoding means obtains preprocessing data relating to a rule for imposing the restriction to the blocks of the periphery of the partial image and obtaining the preprocessing data relating to a rule imposing no restriction to the other blocks of the partial image.

6. An adaptable shape image encoding apparatus according to claim 1 or 2, wherein the base image is an image obtained by expanding a 360° omnidirectional image.

* * * * *